Figure 1:
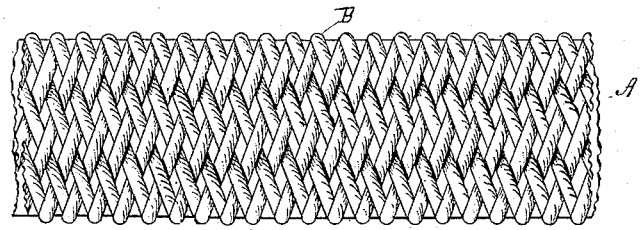

(No Model.)

A. T. HOLT.
HOSE.

No. 334,951.      Patented Jan. 26, 1886.

United States Patent Office.

ALBERT T. HOLT, OF BROOKLYN, ASSIGNOR TO RUDOLPH A. LOEWENTHAL AND ALBERT G. MORGANSTERN, BOTH OF NEW YORK, N. Y.

HOSE.

SPECIFICATION forming part of Letters Patent No. 334,951, dated January 26, 1886.

Application filed September 17, 1884. Serial No. 143,282. (No model.)

*To all whom it may concern:*

Be it known that I, ALBERT T. HOLT, of the city of Brooklyn, Kings county, State of New York, have invented certain new and useful Improvements in Hose, of which the following is a specification.

My invention relates to a compound rubber and textile hose having certain characteristics and advantages not found in articles of this kind heretofore made.

In the hose that I have produced the rubber tube and the textile covering are very intimately combined together, even to such an extent that the outer portion of the rubber tube and the inner portion of the textile enter into and mingle with each other. The rubber tube which is so combined with the textile is, moreover, homogeneous, and need not be coated with any vulcanizable cement to produce the above results, though the addition of such a cement may in some cases be deemed an advantage.

In practical use the hose which I have produced will, on account of its homogeneous character and intimate union of its parts throughout, be found firm, compact, without looseness of the covering upon the rubber tube, free from a tendency to collapse and break when bent in a sharp curve, and consequently very durable.

Although the hose is compound, made of two individual tubes of different materials, it may practically be said to be as uniform and homogeneous as if made of a single substance.

In manufacturing the hose I follow the process which is the subject of my Letters Patent No. 323,149, dated July 28, 1885.

I am aware that heretofore a hose has been made in which the textile covering was braided in place upon the unvulcanized rubber tube, which latter was subsequently vulcanized. Such a hose is described in English Patent No. 1,861 of 1857; also, that a hose has been made in which the textile tube already formed was drawn over an unvulcanized rubber tube, which was subsequently attempted to be expanded into intimate union with the textile and afterward vulcanized. Such a hose is described in United States Patent No. 42,900, to Harris. Both of these hose, however, are different from that which I have produced, in that there is in the former no mingling of the rubber with the textile such as is necessary to uniformity, firmness, and durability.

In making the hose described in the said English patent the rubber is not forced into the textile by internal pressure before vulcanization.

In Harris's hose the internal pressure is applied; but the textile tube having previously been completed of larger internal diameter than the exterior of the rubber tube, and having been drawn over the latter with more or less looseness, instead of being braided tightly strand by strand in place upon the rubber, the internal pressure expends itself in swelling out the rubber tube into a mere contact with the textile. When vulcanized in this state, it is obviously weaker than when the rubber tube is pressed against a textile previously braided tightly over it; but a more serious difficulty is that the rubber tube, where it has a distance to expand, will often fail to do so evenly. From inequality in the temperature of the different parts of the tube, or other causes, it will at times swell more in some places than in others, in some places even failing to come into close contact with the textile. Where, however, as in producing my hose, the textile is both braided tightly in place strand by strand upon the unvulcanized and somewhat soft rubber tube, and afterward internal pressure is applied to the latter and it is vulcanized in such conditions, the result is different, and a hose is made having the characteristics and advantages already described.

Figure 2:
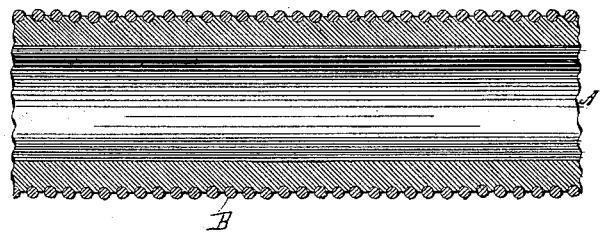

In the drawings, Figure 1 is a side view of my improved hose. Fig. 2 is a sectional view of the same.

Like letters indicate like parts in both figures, and the braid is made open to show meshes, the better to illustrate the covering material.

My improved hose is so constructed that the internal layer of rubber or other vulcanizable material consists of a continuous seamless pipe or tube, over which the braided textile covering is applied, and there may be (though not necessary) a coating of rubber or other vulcanizable compound superimposed upon the central seamless pipe or tube, if desired, before the braiding.

In the drawings, A A is the continuous seamless tube or pipe of rubber or other vulcanizable compound, prepared as desired for the special use intended, as now well known in the art. This tube or pipe is made by the employment of any suitable apparatus now used for the manufacture of seamless rubber tubes or analogous purposes, and it may be of any desired length. When the tube or pipe is made, it is braided over with a strong cotton braid, B B. I prefer to treat this fibrous material, either during the braiding operation or afterward, with a solution of naphtha and india-rubber, which, when vulcanized, unites the several strands of the braid or other like fibrous covering material firmly to each other, greatly strengthening the hose. If more than one layer of strengthening and protecting material be used, they may all be treated with this cement solution, if desired. After the tube has been thus formed it is placed in any suitable vulcanizing apparatus and the vulcanizable compound suitably vulcanized, preferably by the introduction of steam within the hose, because if steam applied internally be used it will, during the vulcanizing process, expand the tube into close contact with the external fibrous strengthening and protecting material, partially embedding the same therein, thus giving the strengthening material a firm hold on the tube, preventing longitudinal movement on the same, and gives rigidity to the hose against internal strain, and causing more perfect action of the cement in the covering material.

The covering material may be colored for the purpose of ornamentation, if desired.

Having thus described my invention and the best means known to me for carrying the same into effect, what I claim, and desire to secure by Letters Patent, is as follows:

As an improved article of manufacture, a hose consisting of a single homogeneous vulcanized rubber tube and a tubular fabric braided or woven in place exteriorly to said vulcanized tube to protect the same, and embedded in the outer surface of the vulcanized substance which permeates the interstices of the fabric, the braiding having been performed prior to the vulcanization, and the rubber tube having subsequently been forced outward into the interstices of the fabric by internal pressure and there vulcanized, substantially as set forth.

Signed at New York, in the county of New York and State of New York, this 15th day of September, A. D. 1884.

ALBERT T. HOLT.

Witnesses:
  JOHN H. IVES,
  RUDOLPH A. LOEWENTHAL.